United States Patent
Smith

(10) Patent No.: US 9,563,813 B1
(45) Date of Patent: *Feb. 7, 2017

(54) SYSTEM AND METHOD FOR TRACKING OBJECTS

(71) Applicant: Google Inc., Mountain View, CA (US)

(72) Inventor: Russell Leigh Smith, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 14/039,313

(22) Filed: Sep. 27, 2013

Related U.S. Application Data

(63) Continuation of application No. 13/116,553, filed on May 26, 2011, now Pat. No. 8,565,481.

(51) Int. Cl.
  *G06K 9/00* (2006.01)
  *G06K 9/32* (2006.01)

(52) U.S. Cl.
  CPC .................. *G06K 9/3241* (2013.01)

(58) Field of Classification Search
  CPC combination set(s) only.
  See application file for complete search history.

(56) References Cited

U.S. PATENT DOCUMENTS

| | | | |
|---|---|---|---|
| 5,311,431 A | 5/1994 | Cao et al. | |
| 5,809,161 A * | 9/1998 | Auty | G01P 3/38 340/937 |
| 6,032,097 A | 2/2000 | Iihoshi et al. | |
| 6,035,053 A | 3/2000 | Yoshioka et al. | |
| 6,272,431 B1 | 8/2001 | Zamojdo et al. | |
| 6,977,630 B1 | 12/2005 | Donath et al. | |
| 7,257,249 B2 * | 8/2007 | Farsaie | H04N 13/0221 345/419 |
| 7,519,223 B2 * | 4/2009 | Dehlin | G06F 3/0354 345/173 |
| 7,764,840 B2 * | 7/2010 | Gendron | G06K 9/6218 367/131 |
| 8,041,509 B2 | 10/2011 | Alfano | |

(Continued)

OTHER PUBLICATIONS

Blackman, Samuel S., Multiple Hypothesis Tracking for Multiple Target Tracking, IEEE A&E Systems Magazine, vol. 19, No. 1, Jan. 2004 Part 2: Tutorials.

(Continued)

*Primary Examiner* — Anand Bhatnagar
(74) *Attorney, Agent, or Firm* — Lerner, David, Littenberg, Krumholz & Mentlik, LLP

(57) ABSTRACT

Embodiments of a system and method for tracking objects are described herein. Aspects of this disclosure efficiently update object "belief" data by creating a bitmap representation of object locations and velocities. The bitmap provides a three-dimensional representation of the object as viewed by one or more sensors. The bitmap representations are blended with sensor data over time to determine a current object belief state which can accurately account for asynchronous sensor data. Peaks in the belief data, which may be represented by pixels with an intensity value above a threshold value, are identified as likely objects. Additional sensor data is used to detect longitudinal velocities located at one or more of the peaks.

20 Claims, 3 Drawing Sheets

(56) References Cited

U.S. PATENT DOCUMENTS

| | | | |
|---|---|---|---|
| 2004/0066966 A1* | 4/2004 | Schneiderman | G06K 9/527 382/159 |
| 2006/0009955 A1* | 1/2006 | Gendron | G06K 9/6218 703/2 |
| 2006/0287819 A1* | 12/2006 | Brulle-Drews | G01C 21/3647 701/431 |
| 2007/0279494 A1* | 12/2007 | Aman | G01S 3/7864 348/169 |
| 2008/0246759 A1 | 10/2008 | Summers | |
| 2015/0243031 A1* | 8/2015 | Narasimha | G06T 7/0042 382/103 |

OTHER PUBLICATIONS

Blanding, Wayne, Willett, Peter, and Bar-Shalom, Yaakov, "ML-PDA: Advances and a New Multitarget Approach", EURASIP Journal on Advances in Signal Processing, vol. 2008, Article ID 260186, 13 pages, Hindawi Publishing Corporation.

Fortmann, Thomas E., Yaskov Bar-Shalom, Schaeffe, Molly, "Multi-Target Tracking Using Joint Probabilistic Data Association" IEEE 1980, pp. 807-812.

Khan, Zia, Balch, Tucker, Dellaert, Frank, "Multitarget Tracking with Split and Merged Measurements," Proceedings of the IEEE Conference on Computer Vision and Pattern Recognitition (CVPR 2005), Jun. 20-25, 2005, pp. 605-610.

Maehlisch, Mirko, Detecting and Tracking Based on Finite-Set-Statistics-Theory for Multisensor ACC, Inst. Measurement, Control and Microtechnology, www.argos.uni-ulm.de; Mar. 15, 2007.

Multi-Target Tracking Using 1st Moment of Random Finite Sets, Panta, Kusha, Department of Electrical and Electronic Engineering, The University of Melbourne, Australia, Feb. 2007.

Vihola, Matti, "Rao-Blackwellised Particle Filtering in Random Set Multitarget Tracking" IEEE Trans. on Aer. and El. Syst. (2006) vol. 43, No. 2, pp. 1-16.

Vo, Ba Tuong, Random Finite Sets in Multi-Object Filtering:, School of Electrical, Electronic and Computer Engineering, The University of Western Australia, Oct. 2008.

Vo, Ba-Ngu and Ma, Wing-Kin, "The Gaussian Mixture Probability Hypothesis Density Filter," IEEE Transactions Signal Processing, vol. 54, No. 11, pp. 4091-4104, Nov. 2006.

\* cited by examiner

SYSTEM AND METHOD FOR TRACKING OBJECTS

CROSS-REFERENCE TO RELATED APPLICATIONS

The present application is a continuation of U.S. patent application Ser. No. 13/116,553, filed May 26, 2011, the disclosure of which is incorporated herein by reference.

BACKGROUND

During common daily activities, human beings rely on input from a multitude of senses. The brain is very efficient at combining sight, sound, and other senses to provide a current environmental state that are used to perform daily tasks such as walking, driving, and the like. Data is aggregated and evaluated unconsciously, efficiently, and accurately.

Computer systems and software exist that attempt to provide an electronic analog to the data aggregation and analysis functions provided by the brain. These systems are capable of determining an object location, a type of object, and other features based on sensor data to assist with the operation of various devices. However, such systems tend to require significant processing power, and thus may not be suitable for use in activities that necessitate real-time performance.

BRIEF SUMMARY

A system and method for tracking objects are described. The system and method function to identify objects within a field of view of one or more sensors. For example, aspects of the disclosure may function to identify objects in the path of a vehicle for the purpose of controlling the movement of the vehicle. The system and method may perform object tracking and identification operations by converting sensor data into a series of three-dimensional bitmap representations, and updating an environmental state by painting three-dimensional bitmaps of the sensor data into the environmental state. Intensity peaks within the three-dimensional bitmap may correspond to the perceived locations of objects. In some aspects, the longitudinal velocity of objects is determined by referencing sensor data corresponding to locations identified by intensity peaks within the three-dimensional bitmap.

One aspect of the disclosure provides a computer-implemented method for tracking objects. The method comprises receiving a first set of input from at least one of one or more sensors to perceive an environment, generating, with a processor, a first three-dimensional bitmap corresponding to an environmental state as perceived by the one or more sensors, from the first set of input, the first three-dimensional bitmap being comprised of a plurality of pixels, and determining an object position using the first three-dimensional bitmap using a processor. The three dimensions of the first three-dimensional bitmap correspond to a first environmental position along an x axis, a second environmental position along a y axis, and a lateral velocity. An intensity of each pixel at a particular coordinate of the bitmap represents a likelihood that an object is at a location within the environment corresponding to the particular coordinate of the three-dimensional bitmap. In another aspect, the method further includes modifying the first set of input received from the at least one of the one or more sensors from a four-dimensional representation to a three-dimensional representation by eliminating a longitudinal velocity from the received input. The method may also include identifying a peak of intensity within the first three-dimensional bitmap, and determining longitudinal velocity of an object located at the intensity peak. The longitudinal velocity may be determined using a radar sensor. In another aspect, the method further includes providing the determined object positions to an autonomous vehicle. The sensors may include at least one of a camera, a laser scanner, and a radar detector. The method may further include receiving a second set of input from at least one of the one or more sensors, and generating a new environmental state by painting the first set of input and the second set of input into a second three-dimensional bitmap. The second three-dimensional bitmap may represent an updated environmental state incorporating the second set of input.

Another aspect of the disclosure provides a processing system for tracking objects. The processing system may include at least one sensor for perceiving an environment and providing a first set of input describing the environment, an object tracking module, a processor for management of the object tracking module, and a memory coupled to the processor, for storing a first three-dimensional bitmap representing an environmental state as perceived by the at least one sensor. The object tracking module may be configured to generate the first three-dimensional bitmap from the first set of input, and to determine an object position using the first three-dimensional bitmap. The three-dimensional bitmap may be comprised of a plurality of pixels. The three dimensions of the first three-dimensional bitmap may correspond to a first position along an x axis, a second position along a y axis, and a lateral velocity. An intensity of each pixel at a particular coordinate within the bitmap may represent a likelihood that an object is at a location within an environment, as perceived by the at least one sensor corresponding to the particular coordinate. The processing system may further include a graphics processing unit configured to generate the first three dimensional bitmap. The graphics processing unit may be further configured to perform a blending operation between the first set of input and a second set of input to generate a second three-dimensional bitmap corresponding to a new environmental state as perceived by the at least one sensor. In another aspect the processor may be further configured to store the first set of input for use in conjunction with a second set of input to generate a new environmental state by painting each set of input into a three-dimensional bitmap. The at least one sensor may include at least one radar sensor, and the object tracking module may be further configured to identify one or more intensity peaks within the three-dimensional bitmap and to determine a longitudinal velocity at each intensity peak using the at least one radar detector.

Another aspect of the disclosure provides a tangible, non-transitory, computer-readable storage medium including instructions that, when executed by a processor, perform a method. The method may include receiving a first set of input from at least one of one or more sensors to perceive an environment, generating, with a processor, a first three-dimensional bitmap corresponding to an environmental state as perceived by the one or more sensors, from the first set of input, the first three-dimensional bitmap being comprised of a plurality of pixels; and determining an object position using the first three-dimensional bitmap using a processor. The three dimensions of the first three-dimensional bitmap correspond to a first environmental position along an x axis, a second environmental position along a y axis, and a lateral velocity. An intensity of each pixel at a particular coordinate of the bitmap represents a likelihood that an object is at a location within the environment corresponding to the particular coordinate of the three-dimensional bitmap. The method may further include modifying the first set of input received from the sensors from a four-dimensional representation to a three-dimensional representation by eliminating a longitudinal velocity from the received input. In another aspect the method may also include identifying a peak of intensity within the first three-dimensional bitmap, and determining a longitudinal velocity of an object at an environmental position corresponding to the peak. In some aspects, the longitudinal velocity is determined using a radar sensor. The method may also include providing the determined object positions to an autonomous driving system. In some aspects, the sensors comprise at least one of a camera, a laser scanner, and a radar detector. In some aspects, the method provided by the storage medium further includes receiving a second set of input from at least one of the one or more sensors, and generating a new environmental state by blending the first set of input with the second set of input by painting each set of input into a second three-dimensional bitmap.

DETAILED DESCRIPTION

Embodiments of a system and method for tracking objects are described herein. Aspects of this disclosure efficiently update object "belief" data by creating a bitmap representation of object locations and velocities. The bitmap provides a three-dimensional representation of the object as viewed by one or more sensors. The bitmap representations are blended with sensor data over time to determine a current object belief state which can accurately account for asynchronous sensor data. Peaks in the belief data, which may be represented by pixels with an intensity value above a threshold value, are identified as likely objects. Additional sensor data is used to detect longitudinal velocities located at one or more of the peaks.

Figure 1:
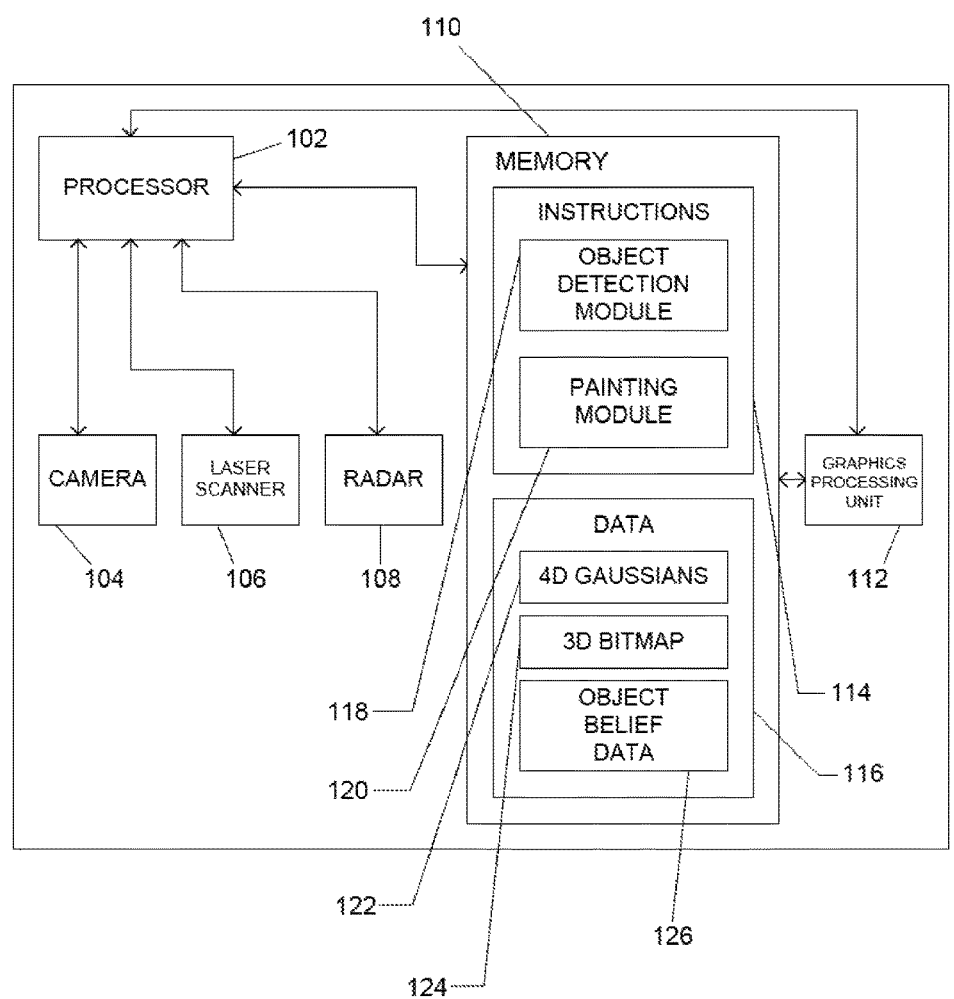
FIG. 1 is a system diagram depicting an example of a tracking system in accordance with aspects of the disclosure.

As shown in FIG. 1, an example tracking system 100 in accordance with one embodiment includes a processor 102 in communication with a memory 110, a graphics processing unit 112, and one or more sensors, such as a camera 104, a laser scanner 106, and a radar detector 108. The tracking system 100 is operable to identify objects based on sensor input from the camera 104, the laser scanner 106, and the radar 108. For example, the tracking system 100 may identify objects to assist with the guidance and/or control of an automated system. In some aspects, the tracking system 100 may interface with an autonomous vehicle to detect and avoid objects in the path of the vehicle. While the concepts described herein are generally discussed with respect to a tracking system to detect objects to be avoided by a vehicle, aspects of the disclosure can be applied to any computing device capable receiving sensor data used for the detection of objects.

The tracking system 100 may include any computing device capable of receiving sensor data and executing software to detect objects within the received sensor data. The tracking system may comprise a personal computer, a personal digital assistant ("PDA"), a tablet PC, a netbook, etc. Indeed, a tracking system 100 in accordance with the systems and methods described herein may comprise any device operative to process instructions and transmit data to and from humans and other computers including general purpose computers, network computers lacking local storage capability, etc.

The memory 110 may store instructions 114 and data 116 that are accessible by the processor 102. The processor 102 may execute the instructions 114 and access the data 116 to control the operations of the tracking system 100.

The memory 110 may be any type of memory operative to store information accessible by the processor 102, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 114 may be any set of instructions 114 to be executed directly (such as machine code) or indirectly (such as scripts) by the processor 102. For example, the instructions may be stored as computer code on a computer-readable medium. In that regard, the terms "instructions" and "programs" may be used interchangeably herein. The instructions 114 may be stored in object code format for direct processing by the processor 102, or in any other computer language including scripts or collections of independent source code modules that are interpreted on demand or compiled in advance. Functions, methods and routines of the instructions 114 are explained in more detail below. In particular, the instructions 114 may comprise an object detection module 118 and a painting module 120.

The object detection module 118 performs analysis on a three-dimensional bitmap, created by input from the various device sensors, such as the camera 104, the laser scanner 106, and the radar detector 108. The object detection module 118 identifies objects from the sensor data, and may inform other elements of the tracking system or other devices of the identified objects. The object detection module 118 determines object locations by analyzing a belief map constructed from a three-dimensional bitmap 124, representing data received from the device sensors. The two of the three dimensions of the three-dimensional bitmap 124 represent a position (e.g., x and y coordinates) in a two dimensional plane as perceived by the various device sensors. The third dimension of the three-dimensional bitmap 124 represents a lateral velocity (movement perpendicular to the sensors field of vision). In some aspects, the object detection module 118 identifies intensity peaks within the three-dimensional bitmap 124, and processes the intensity peaks with the radar detector 108 to identify a longitudinal velocity at each peak. For example, the object detection module 118 may communicate with a vehicle automation system (not shown) external to the tracking system 100, for the purpose of identifying objects in the path of a vehicle.

The painting module 120 receives input from the device sensors to generate a bitmap representing an environmental state, from which object locations may be derived. In some aspects, the sensor input is received as one or more four-dimensional Gaussians 122, representing an object location on an x and y axis, and object velocities along the x and y axes. The painting module 120 converts the four-dimensional Gaussians 122 into three-dimensional bitmaps by eliminating the longitudinal, or y axis velocity factor. The painting module 120 paints the three-dimensional bitmaps representing sensor data into a previously generated set of sensor data 126 to generate a new set of object belief data 126.

In some aspects, the process of painting a set of sensor data to generate a three-dimensional bitmap of belief data is performed by a graphics processing unit 112, such as a computer video card. Aspects may be performed efficiently using programmable pixel shaders that perform the painting process. In some instances, these pixel shaders are more efficient than traditional computer processors, thus representing a net performance gain compared to using traditional central processing units.

In some aspects, the computation may be divided into "time steps". Each time step represents a small slice of time, for example, 100 milliseconds, 67 milliseconds, 500 milliseconds, or any other time period. At each time step the old belief bitmap is discarded and sensor data is painted into a new, empty belief bitmap (e.g., a bitmap where all pixels have an intensity of zero). The "current state" of the tracking system is not held in the belief bitmap but in the historical record of sensor data that has been received. The painting process may use sensor data received not only during the current time step but in some number of prior time steps, for example, the sensor data received over the most recent 1 second interval, the most recent 2 second interval, the most recent minute of sensor data, etc.

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 102 may be any processor, such as various commercially available general purpose processors. Alternatively, the processor may be a dedicated controller such as an application-specific integrated circuit ("ASIC").

Although FIG. 1 functionally illustrates the processor 102 and memory 110 as being within a single block, it should be understood that the processor 102 and memory 110 may comprise multiple processors and memories that may or may not be stored within the same physical housing. Accordingly, references to a processor, computer or memory will be understood to include references to a collection of processors, computers or memories that may or may not operate in parallel.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the tracking system 100, various aspects of the system and method may be implemented by multiple computers, each having at least one processor.

Figure 2:
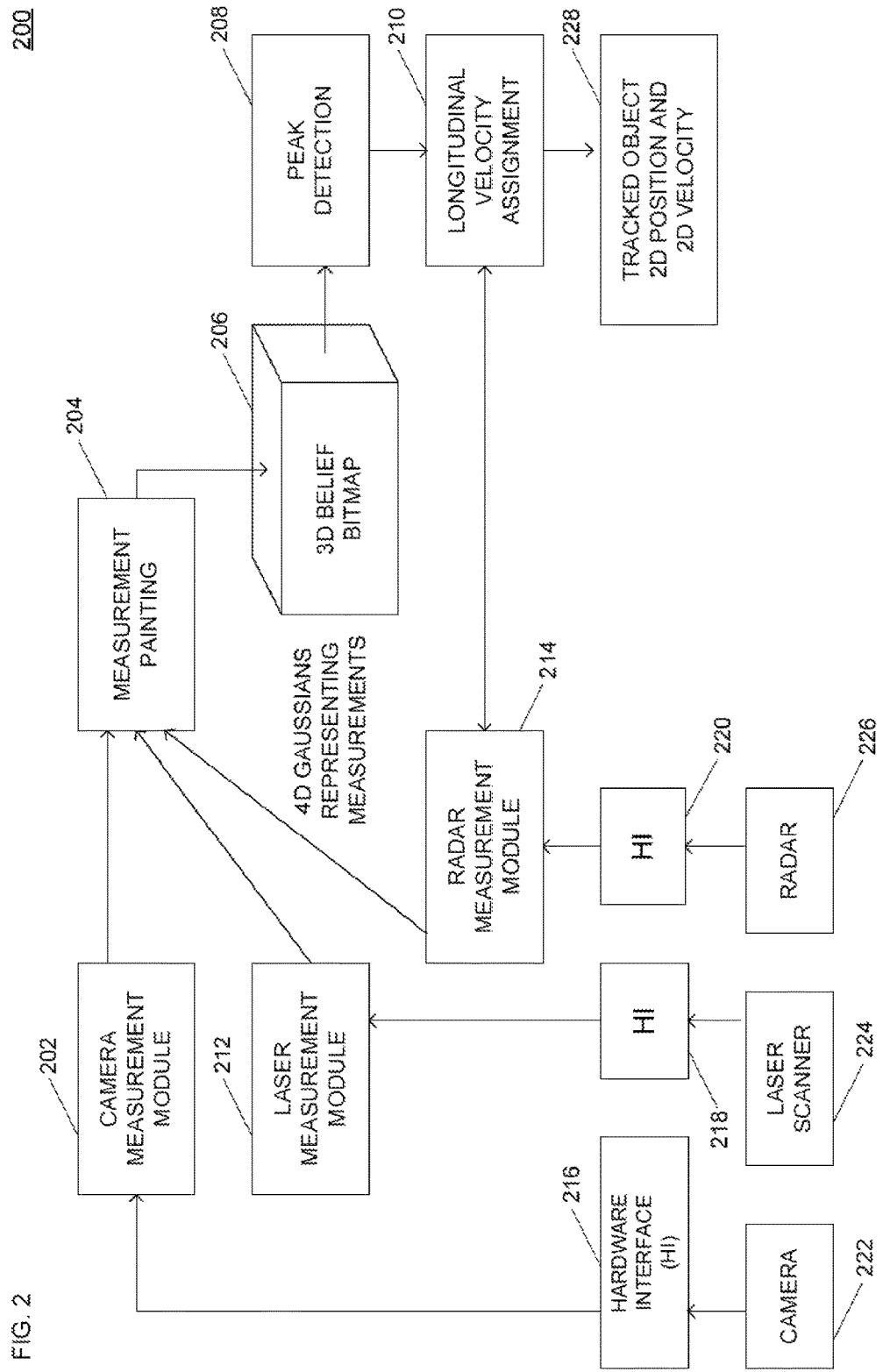
FIG. 2 is block diagram depicting a data flow through an example tracking system in accordance with aspects of the disclosure.

FIG. 2 is block diagram depicting a data flow 200 through an example tracking system in accordance with aspects of the disclosure. The data flow 200 illustrates a process by which sensor data is received from one or more sensors, such as a camera 222, a laser scanner 224, and/or a radar detector 226, and then used to identify one or more tracked objects and a velocity associated with the object.

Each of the camera 222, the laser scanner 224, and the radar detector 226 are coupled to hardware interfaces (HI) 216, 218, 220, respectively. The hardware interfaces 216, 218, 220 translate data received from their respective sensors into a format suitable for transmission throughout the tracking system. Each of the hardware interfaces 216, 218, 220 is coupled to a camera measurement module 202, a laser measurement module 212, or a radar measurement module 214, respectively. The respective measurement modules translate the raw data received from the hardware interfaces 216, 218, 220, into a format that may be used by the tracking system. For example, the measurement modules 202, 212, 214 may translate the signals into a set of four-dimensional Gaussians. The four dimensional Gaussians may take the form of a state vectors s describing the mean of the Gaussian and a 4×4 covariance matrix identifying the extent of the Gaussian. The state vector s may take the form:

$$s = \begin{bmatrix} x \\ y \\ dx/dt \\ dy/dt \end{bmatrix} = \begin{bmatrix} x \\ y \\ v_x \\ v_y \end{bmatrix} \quad \text{(Eq. 1)}$$

where each state vector s represents a location of an object in an x/y plane as identified by the respective sensor. The $v_x$ and $v_y$ terms represent a longitudinal velocity and a lateral velocity of the object, respectively. To use the example of an autonomous vehicle, the longitudinal velocity $v_x$ refers to the velocity of the object along an axis parallel to the direction of travel of the autonomous vehicle (e.g., forward and back from the perspective of the driver), while the lateral velocity $v_y$ refers to the velocity of the object along an axis perpendicular to the direction of travel of the autonomous vehicle (e.g., left and right from the perspective of the driver).

The four-dimensional Gaussians that represent object measurements are painted to generate a three-dimensional bitmap at block 204. For example, the four-dimensional Gaussians may be formatted for use in a three-dimensional bitmap by integrating all objects with different longitudinal velocities along the longitudinal velocity axis to a single pixel, thus dropping the longitudinal velocity term, $v_x$.

In some aspects, the measurement painting is performed along with previous sensor measurements to generate an updated three-dimensional bitmap. For example, measurements from the past 1 second, 2 seconds, or 5 seconds may be painted together to generate the three-dimensional bitmap. The painting operation may be performed by a graphics processing unit specifically programmed to paint three-dimensional belief bitmaps, such as the graphics processing unit 112. An exemplary three-dimensional bitmap is described below (see FIG. 3).

At block 206, the painting of the four-dimensional Gaussians into the three-dimensional bitmap results in a three-dimensional belief bitmap, where the likelihood of a particular object being at a particular x, y, dx/dt point is represented by the intensity of the pixel at that point.

At block 208, peaks are identified within the three-dimensional belief bitmap. These peaks represent locations where objects are most likely to exist based on received measurements.

At block 210, a longitudinal velocity is identified for each of the peak locations. For example, the tracking system 100 may utilize measurements from the radar system 226 as provided by the radar measurement module 214 to identify the longitudinal velocity at the peaks identified at block 208. The radar measurement module 214 makes a direct, physical measurement of longitudinal velocity ($V_x$), thus providing an efficient way to reconstruct the longitudinal velocity that was removed from the three-dimensional Gaussian prior to generation of the three-dimensional bitmap. While the radar system 226 is identified as an example sensor that provides data useful to identify the longitudinal velocity because radar detectors are particularly accurate at measuring longitudinal velocity, other types of sensors could also be used to detect a longitudinal velocity at the detected peaks. The three-dimensional bitmap drops the $V_x$ axis because the radar or another sensor may later measures the longitudinal velocity directly. The peak values and associated longitudinal velocities are then provided to an external system at block 228, such as, for example, an automated driving system for controlling a vehicle. In this manner the data flow 200 provides for an efficient method of identifying likely object locations and velocities.

Figure 3:
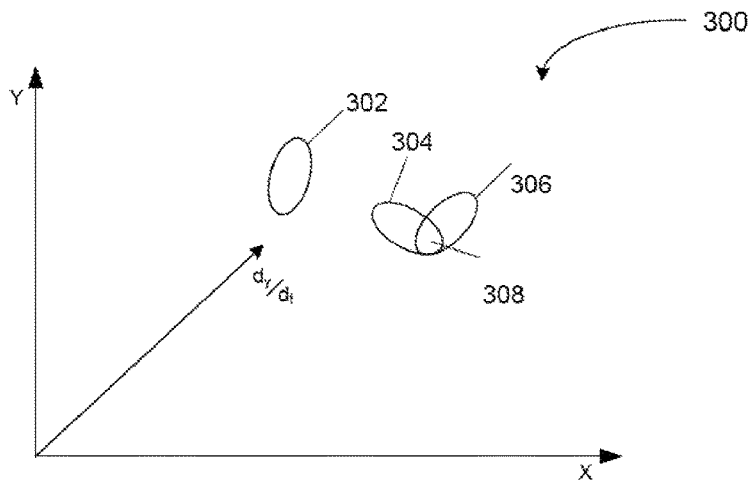
FIG. 3 is a block diagram of an example three-dimensional bitmap in accordance with aspects of the disclosure.

FIG. 3 is a block diagram of an example three-dimensional bitmap 300 in accordance with aspects of the disclosure. The three-dimensional bitmap represents space in an x/y plane, with a depth characteristic representing a lateral velocity. The x/y plane corresponds to a environment measurement as received from one or more sensors, as described above. A position and velocity of each object is represented by a Gaussian, demonstrated in the diagram as an ellipse, such as the ellipses 302, 304, and 306. These ellipses are merely a schematic representation of a Gaussian. They function as a visual aid to indicate the "outline" or "one-standard-deviation contour" of the Gaussian. In practice, the element painted into the three-dimensional bitmap is not a flat ellipse but a kind of "fuzzy blob" with highest intensity in the center position, represented by the state vector s and intensity trailing further away from s according to the standard Gaussian probability density function.

Objects may be represented as an ellipse rather than a point in order to account for both a margin of error in sensor measurements and the fact that objects have a non-zero length and width.

Each individual pixel of the three-dimensional bitmap has an intensity value. The intensity value corresponds to the likelihood that an object is present at that particular location. In other words, the intensity may be presented as a function that covers the single-object state space that has peaks where an object may be. The intensity may be updated per time step and per measurement in a way similar to a Kalman filter updating its state. Gaussian "blobs" representing possible object locations (e.g., a beginning environment state corresponding to previous sensor input) may be updated at each time step by other Gaussian blobs representing measurements (e.g., a new environment state received via new sensor input). In this manner, new Gaussians are created, and irrelevant Gaussians (e.g., Gaussians below a minimum belief threshold) are pruned. Aspects of the disclosure control the amount of time that sensor data is allowed to influence the current estimate of object positions. Sensor measurements older than this amount of time are allowed to decay after this period of time. These older measurements are thus not used when painting the three-dimensional bitmap. Object positions are identified by extracting the set of high probability Gaussians at the intensity peaks.

When a first Gaussian is painted over a second Gaussian, the overlapping pixels increase in intensity, forming a peak 308, such as caused by the overlap of the Gaussians represented by ellipses 304 and 306. The peak 308 represents a location where it is probable an object exists. This peak 308 may be identified by an overlap of Gaussians as measured by the sensors and painted into the three-dimensional bitmap, which causes an increase in pixel intensity in the area of the overlap.

Figure 4:
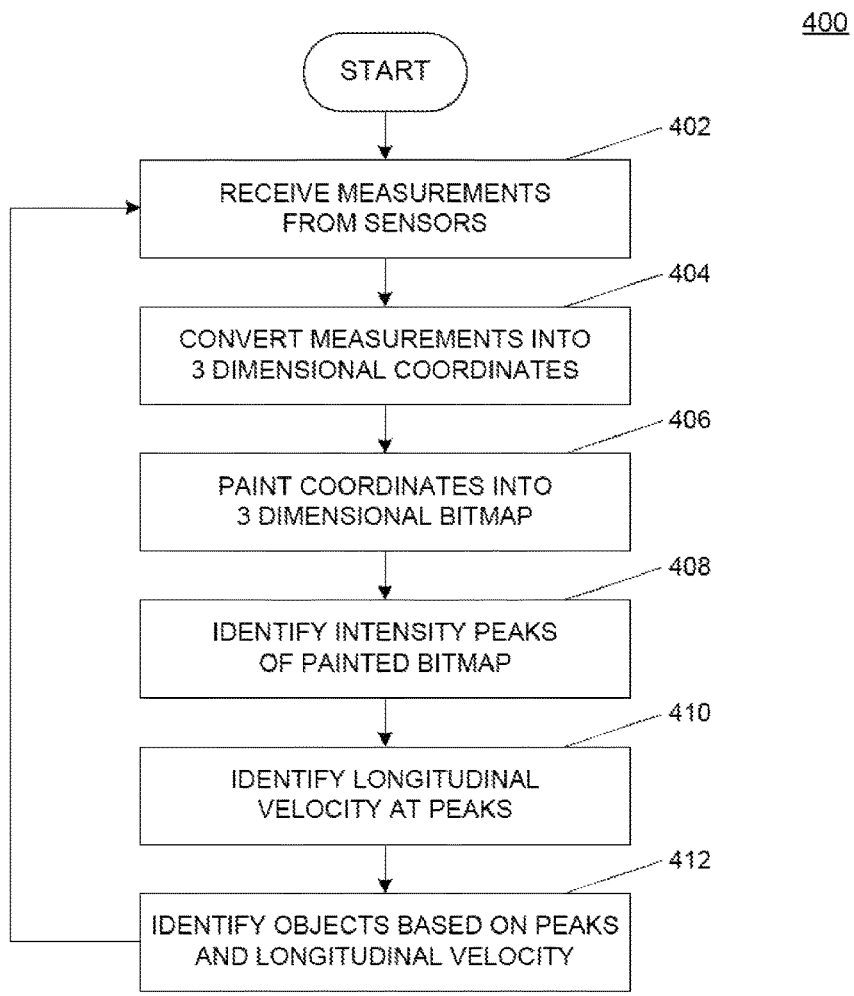
FIG. 4 is a flow diagram depicting an example method for tracking an object in accordance with aspects of the disclosure.

FIG. 4 is a flow diagram depicting an example method 400 for tracking an object in accordance with aspects of the disclosure. The method 400 illustrates a process by which sensor data may be painted into a three-dimensional bitmap representation. The three-dimensional bitmap representation may be used to identify the location of objects by measuring an intensity value associated with pixels of the bitmap, where the intensity corresponds to a probability that an object is present at the point represented by the pixel. By representing an environmental state using a bitmap, the environmental state may be efficiently updated by painting new sensor data into the three-dimensional bitmap using a graphics processing unit, such as the graphics processing unit 112 described with respect to FIG. 1.

At block 402, environmental measurements are received from one or more sensors. For example, a camera, a laser scanner, or a radar detector may identify one or more objects in a given field of view. The sensor data may be provided as one or more four-dimensional Gaussian blobs representing objects identified by the sensor.

At block 404, the four-dimensional Gaussian blobs are converted to three-dimensional coordinates by integrating all objects with a common longitudinal velocity along a single axis, and dropping the longitudinal velocity element of the four-dimensional data set. Thus each four-dimensional Gaussian is represented as a three-dimensional Gaussian.

At block 406, the three-dimensional Gaussian or Gaussians as determined at block 404 are painted to create a three-dimensional bitmap representation of the objects identified by the sensor data. The intensity of a pixel at each coordinate within the three-dimensional bitmap represents the likelihood that an object is present at the location and velocity represented by that pixel.

The three-dimensional bitmap may be stored as a number of two-dimensional slices stacked on top of each other. Each two-dimensional slice is represented as a texture that functions as a source for painting into the three-dimensional bitmap. The two-dimensional texture represents a two-dimensional Gaussian with circular symmetry. In other words, the slice may be a circular "blob" of pixels where the pixels toward the center of the blob have a high intensity. The intensity of the pixels decays to near-zero at the edges of the blob.

For every slice of the three-dimensional bitmap (e.g., a one pixel wide two-dimensional plane of the three-dimensional bitmap), aspects of the system and method rasterize an affine-transformed copy of the two-dimensional texture into the bitmap slice, with the affine-transform being determined by the mean and covariance matrix of the three-dimensional Gaussian. The process is efficient because the rasterization process only touches pixels in the three-dimensional bitmap in the locality of the Gaussian. No computational processing is necessary for unrelated pixels.

As such, aspects of the disclosure may employ a mathematical approximation of the Gaussian combinations that allow the combinations to be performed as an addition operation, rather than a multiplication. Individual sensor measurements for each object may be painted into the three-dimensional bitmap one at a time, with an individual probability of detection of an object set close to zero. This means that the probability of detection of any one object is low.

When Gaussians are painted into the bitmap, they are painted additively. In other words, the pixel values in the final bitmap may be the sums of the pixel values of the painted Gaussians, rather than, for example, their product. The Gaussians for older sensor measurements are downweighted; for example, the pixel values may be multiplied by a scale factor less than one. As a result, older measurements contribute less pixel intensity to the final three-dimensional bitmap representation. Recent measurements are typically more relevant and thus should be weighted more highly, while older measurements have less to do with where an object is right now, and should therefore be downweighted. The Gaussians for older measurements may be distorted according to a "motion model". For example, a Gaussian from a radar measurement taken N seconds ago, with a $V_x$ value of K meters per second will be displaced along the X axis by N*X meters before being painted into the current belief bitmap, to account for the projected current position based on the old measured position and velocity.

To following mathematical principles illustrate the process by which the sums of the pixel values of a Gaussian may be used instead of the product. One way to model this approach is to set a given probability of detection of an object for each given measurement, $P_D$, to a value close to zero.

$$\hat{B}(\hat{x})=[1-P_D+P_DN(z,\hat{x})][\int A(\hat{x},x)B(x)dx] \quad (Eq. 2)$$

where $\hat{B}(\hat{x})$ is the belief function, $P_D$ is the probability of detection of an object, $N(z,\hat{x})$ is the probability that a given measurement, z, comes from an object state at the next measurement timestep, $\hat{x}$, $A(\hat{x},x)$ is a process model for a state estimate in the absence of additional measurements, and $B(x)$ is a belief that an object exists at a position x. Taking the log of the belief function modifies Equation 2 to the following form:

$$\log \hat{B}(\hat{x})=\log [1-P_D+P_DN(z,\hat{x})]+\log [\int A(\hat{x},x)B(x)dx] \quad (Eq. 3)$$

Making the assumption that there is no process noise (an approximation), and that A is a one-to-one transformation results in the following simplification of Equation 3:

$$\log \hat{B}(\hat{x})=\log [1-P_D+P_DN(z,\hat{x})]+[\int A(\hat{x},x)B(x)dx] \quad (Eq. 4)$$

The offset and scale of the result may be simplified since the function is focused on peak detection. If $\hat{Q}(\hat{x})$ is a scaled and offset version of log B, Equation 4 simplifies to the following form:

$$\hat{Q}(\hat{x})=\log [1-P_D/P_D+N(z,\hat{x})]+[\int A(\hat{x},x)A(x)dx] \quad (Eq. 5)$$

which then simplifies to the form:

$$\hat{Q}(\hat{x})=\log [k+N(z,\hat{x})]+[\int A(\hat{x},x)Q(x)dx] \quad (Eq. 6)$$

As $P_D \to 0$, the term $k \to \infty$. Basic rules of logarithmic algebra state that:

$$\lim_{k \to \infty} \log(k+a) = \log(k) + \frac{a}{k} \quad (Eq. 7)$$

As such, by employing this principle to Equation 6, the Equation simplifies to:

$$\lim_{P_D \to 0} \hat{Q}(\hat{x}) = \log(k) + \frac{1}{k}N(z,\hat{x}) + \left[\int A(\hat{x},x)Q(x)dx\right] \quad (Eq. 8)$$

By rescaling and shifting Q, Equation 8 becomes:

$$\lim_{P_D \to 0} \hat{Q}(\hat{x}) = N(z,\hat{x}) + \left[\int A(\hat{x},x)Q(x)dx\right] \quad (Eq. 9)$$

Thus, the result is that measurements may be added to a log-belief rather than multiplied to determine new belief values. If N is a Gaussian, then the above approximation is accurate for large values of $P_D$. For example, the approximation may be used for values of $P_D$ from 0 to 0.5, or other greater or lesser values of $P_D$ depending upon the degree of accuracy desired.

Such addition operations are generally easier to implement programmatically. In some aspects, the update of the belief functions is therefore performed by blending the bitmap representing new measurements previous measurement data, an operation efficiently implementable on graphics processing units, such as the graphics processing unit 112.

At block 408, peaks in intensity are identified within the three-dimensional bitmap. As stated above, these peaks correspond to the most likely locations where an object may be present. In some aspects, peaks in intensity are identified by first identifying all belief bitmap pixels that are both above a threshold and are a maxima in a local neighborhood of pixels. At block 410, the longitudinal velocity of the objects located at the peaks is identified to determine a position of the peak in a hypothetical four-dimensional space. For example, measurements received from the radar sensor may be analyzed to extract longitudinal velocities at the locations identified by the intensity peaks. Once peak detection is completed aspects of the method may use the radar sensor data to reconstruct the likely location of the peak along the $V_x$ axis that was previously dropped when converting the four-dimensional Gaussian sensor measurements into a three-dimensional representation.

In some aspects, a radar detector may specifically poll locations identified by the peaks, or the radar measurements may be analyzed prior to conversion to a three-dimensional representation from a four-dimensional representation.

At block 412, likely object locations and associated lateral velocity and longitudinal velocity are identified. These object locations may be identified by using the locations of the peaks identified at block 410 as seed values for a Levenberg-Marquardt optimization algorithm that finds the local maxima in the sum of measurement Gaussians. The resulting local maxima whose belief value is greater than a pre-set threshold may be identified as likely object locations.

These likely object locations and velocities may be reported to other software executing within the tracking system, or reported externally to other devices, such as an automatic driving system used to control a vehicle. The method 400 as described above may be repeated as new sensor data is received by the system, painting newly received sensor data into previous three-dimensional bitmap environmental states. This process may identify new objects while allowing "stale" object data to decay, as the painting process may cause intensity values to diminish over time in locations where objects are no longer present, as the previous object data ellipses are painted over by new data.

The stages of the illustrated methods described above are not intended to be limiting. The functionality of the methods may exist in a fewer or greater number of stages than what is shown and, even with the depicted methods, the particular order of events may be different from what is shown in the figures.

The systems and methods described above advantageously provide for an improved method of tracking objects. Representation of sensor data using a three-dimensional bitmap advantageously provides an efficient way to incorporate and analyze new sensor data in an asynchronous manner. Reconstruction of longitudinal velocity using radar measurements provides an accurate environment state while eliminating many of the computational complexities resulting from processing four-dimensional Gaussians.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for tracking objects, the method comprising:
   obtaining a set of input from one or more sensors, the sensors being configured to perceive an environment;
   determining, using one or more processors, a three-dimensional bitmap associated with an environmental state based on the set of input, the three-dimensional bitmap comprising a plurality of pixels; and
   identifying, using the one or more processors, a position for an object using the three-dimensional bitmap, wherein an intensity of each pixel at a particular coordinate of the bitmap represents a likelihood that the object is at a location within the environment corresponding to the particular coordinate of the three-dimensional bitmap; and
   controlling a vehicle using an automated driving system based on the position in order to avoid the object.

2. The method of claim 1, wherein the three dimensions of the three-dimensional bitmap correspond to a first environmental position along an x axis, a second environmental position along a y axis, and a lateral velocity.

3. The method of claim 2, further comprising modifying the set of input obtained from the one or more sensors from a four-dimensional representation to a three-dimensional representation by eliminating a longitudinal velocity from the obtained input.

4. The method of claim 3, further comprising:
   identifying a peak of intensity within the three-dimensional bitmap; and
   determining a longitudinal velocity of a given object located at the intensity peak.

5. The method of claim 2, wherein the longitudinal velocity is identified using a radar sensor.

6. The method of claim 1, further comprising providing the identified position of the object to an autonomous vehicle.

7. The method of claim 1, wherein the one or more sensors comprise at least one of a camera, a laser scanner, and a radar detector.

8. The method of claim 1, further comprising:
   obtaining a second set of input from the one or more sensors; and
   generating a new environmental state by painting the obtained sets of input into a second three-dimensional bitmap, the second three-dimensional bitmap representing an updated environmental state incorporating the second set of input.

9. A tangible, non-transitory, computer-readable storage medium comprising instructions that, when executed by one or more processors, perform a method for tracking objects, the method comprising:
   obtaining a set of input from one or more sensors, the sensors being configured to perceive an environment;
   determining a three-dimensional bitmap associated with an environmental state based on the set of input, the three-dimensional bitmap comprising a plurality of pixels;
   identifying a position for an object using the three-dimensional bitmap, wherein an intensity of each pixel at a particular coordinate of the bitmap represents a likelihood that the object is at a location within the environment corresponding to the particular coordinate of the three-dimensional bitmap; and
   controlling a vehicle using an automated driving system based on the position in order to avoid the object.

10. The non-transitory computer-readable storage medium of claim 9, wherein the three dimensions of the three-dimensional bitmap correspond to a first environmental position along an x axis, a second environmental position along a y axis, and a lateral velocity.

11. The non-transitory computer-readable storage medium of claim 10, wherein the method further comprising modifying the set of input obtained from the one or more sensors from a four-dimensional representation to a three-dimensional representation by eliminating a longitudinal velocity from the obtained input.

12. The non-transitory computer-readable storage medium of claim 11, wherein the method further comprising:
   identifying a peak of intensity within the three-dimensional bitmap; and
   determining a longitudinal velocity of a given object located at the intensity peak.

13. A processing system for tracking objects comprising:
   one or more sensors;
   a memory for storing a three-dimensional bitmap; and
   one or more processors coupled to the memory, the one or more processors being configured to:
   obtain a set of input from the one or more sensors, the sensors being configured to perceive an environment;

determine a three-dimensional bitmap associated with an environmental state based on the set of input, the three-dimensional bitmap comprising a plurality of pixels; and identify a position for an object using the three-dimensional bitmap, wherein an intensity of each pixel at a particular coordinate of the bitmap represents a likelihood that the object is at a location within the environment corresponding to the particular coordinate of the three-dimensional bitmap; and controlling a vehicle using an automated driving system based on the position in order to avoid the object.

14. The processing system of claim 13, wherein the three dimensions of the three-dimensional bitmap correspond to a first environmental position along an x axis, a second environmental position along a y axis, and a lateral velocity.

15. The processing system of claim 14, wherein the one or more processors are further configure to modify the set of input obtained from the one or more sensors from a four-dimensional representation to a three-dimensional representation by eliminating a longitudinal velocity from the obtained input.

16. The processing system of claim 15, wherein the one or more processors are further configure to:

identify a peak of intensity within the three-dimensional bitmap; and determine a longitudinal velocity of a given object located at the intensity peak.

17. The processing system of claim 14, wherein the longitudinal velocity is identified using a radar sensor.

18. The processing system of claim 13, wherein the processor is further configure to provide the identified position of the object to an autonomous vehicle.

19. The processing system of claim 13, wherein the one or more sensors comprise at least one of a camera, a laser scanner, and a radar detector.

20. The processing system of claim 13, wherein the one or more processors are further configure to:

obtain a second set of input from the one or more sensors; and generate a new environmental state by painting the obtained sets of input into a second three-dimensional bitmap, the second three-dimensional bitmap representing an updated environmental state incorporating the second set of input.

* * * * *